(No Model.) 3 Sheets—Sheet 1.

W. T. HOLLAND.
APPARATUS FOR UTILIZING THE WASTE HEAT FROM RANGES.

No. 324,841. Patented Aug. 25, 1885.

WITNESSES:
E. B. Bolton
Geo. H. Fraser.

INVENTOR:
William T. Holland
By his Attorneys,
Burke, Fraser & Hammond (No Model.) 3 Sheets—Sheet 2.
W. T. HOLLAND.
APPARATUS FOR UTILIZING THE WASTE HEAT FROM RANGES.
No. 324,841. Patented Aug. 25, 1885.
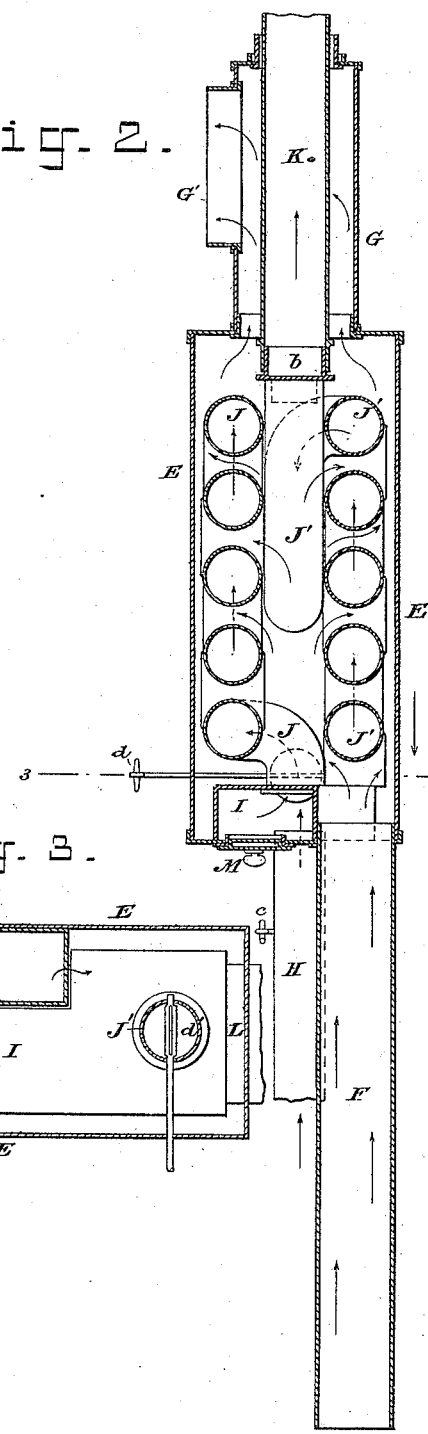
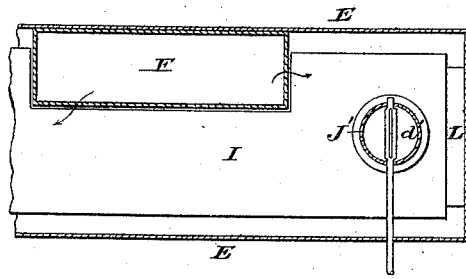
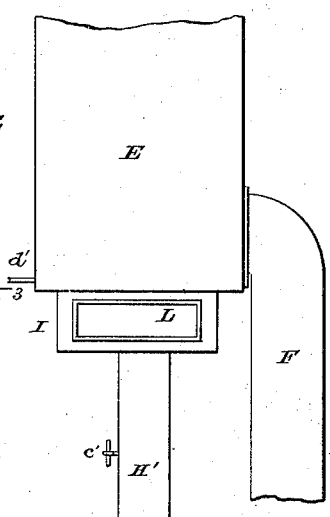
WITNESSES:
E. B. Bolton
Geo. H. Fraser.
INVENTOR:
William T. Holland
By his Attorneys,
Burke, Fraser & Connett (No Model.) 3 Sheets—Sheet 3.

W. T. HOLLAND.
APPARATUS FOR UTILIZING THE WASTE HEAT FROM RANGES.

No. 324,841. Patented Aug. 25, 1885.

WITNESSES:
E. B. Bolton
Geo. Bainton

INVENTOR:
William T. Holland
By his Attorneys,
Burke, Fraser & Connett

United States Patent Office.

WILLIAM T. HOLLAND, OF BROOKLYN, NEW YORK.

APPARATUS FOR UTILIZING THE WASTE HEAT FROM RANGES.

SPECIFICATION forming part of Letters Patent No. 324,841, dated August 25, 1885.

Application filed January 12, 1885. (No model.)

*To all whom it may concern:*

Be it known that I, WILLIAM T. HOLLAND, a citizen of the United States, and a resident of Brooklyn, Kings county, New York, have invented certain new and useful Improvements in Apparatus for Utilizing the Waste Heat from Ranges and Cooking-Stoves, of which the following is a specification.

My invention relates to a heating apparatus to be used especially in conjunction with a range forming a permanent fixture in a house; and it is designed to utilize the waste heat from the range to warm the rooms of the house on the floors above the kitchen.

The novel features of my invention will be fully described hereinafter, and particularly defined in the claims.

In houses provided with heating apparatus of the usual kind—such as a large furnace in the cellar, for example—the occupant finds it difficult and expensive in the variable spring and autumn months to warm the house comfortably on the colder days and omit the heat on the warmer days. To do this the furnace must be carefully attended and the fire allowed to die out frequently, and be as frequently rebuilt; but the fire in the range is kept constantly going, and the waste heat from it may by the use of my apparatus be utilized to warm the house sufficiently during the colder days of spring and autumn, while on the warmer days this heat may be entirely cut off in an instant and turned on as quickly.

Figure 1:
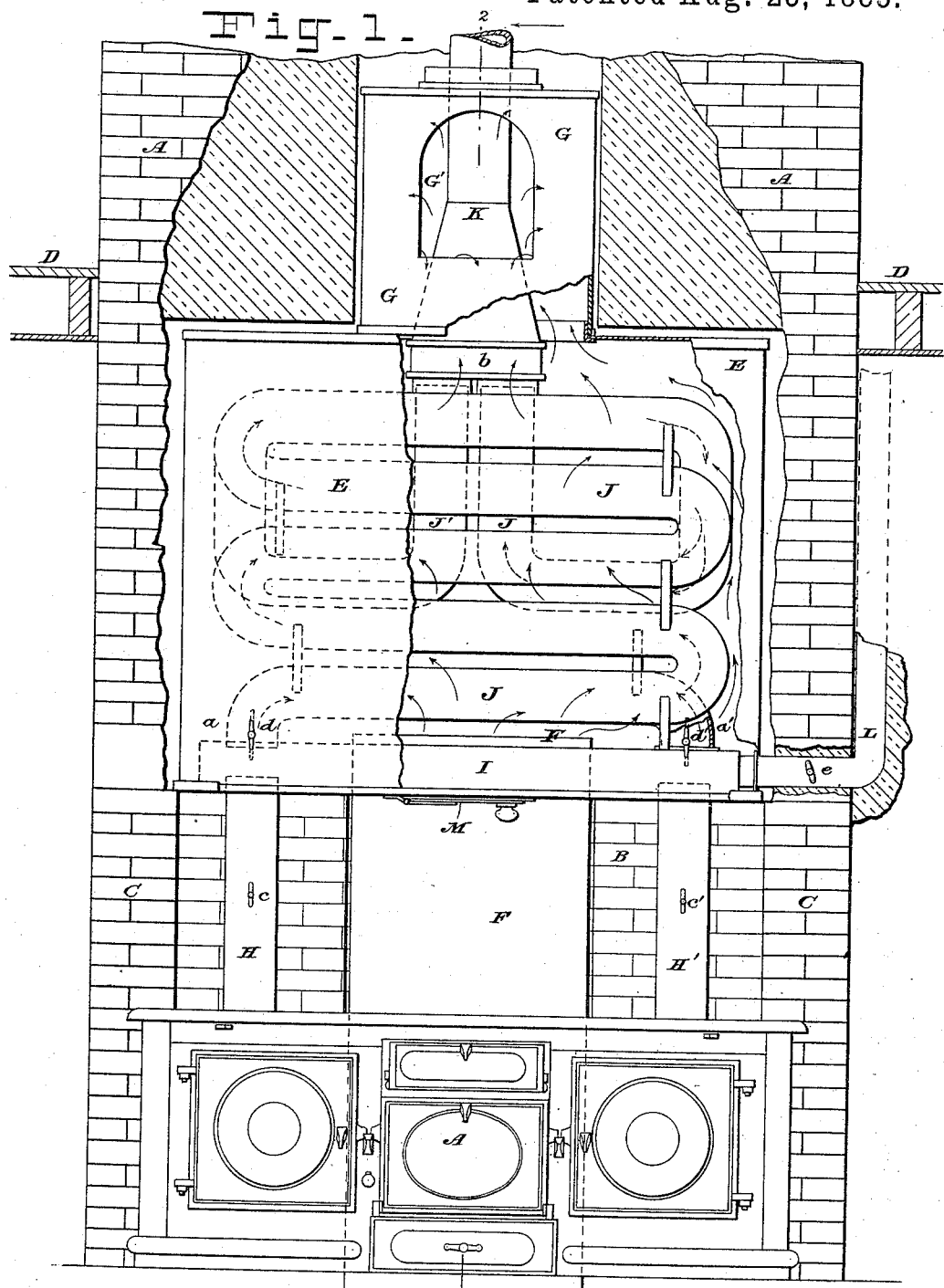

In the drawings which serve to illustrate my invention, Figure 1 is a front view of a range of the usual kind and my apparatus in conjunction therewith. A portion of the wall in which the heater is set is broken away to show the apparatus, and a portion of the exterior casing of the apparatus is broken away to show its interior. Fig. 2 is a vertical mid-section of my apparatus, taken in the plane of the line 2 2 in Fig. 1. Fig. 3 is a horizontal section taken in the plane of line 3 3 in Fig. 2. Fig. 4 is a side view illustrating a slightly-modified form of my apparatus. Figs. 5, 6, 7, and 8 illustrate other slight modifications, which will be hereinafter described.

Let A represent an ordinary range for cooking set in a recess in the chimney-breast B, between jambs C C. The range sets on a level with the kitchen-floor; and D represents the parlor-floor above. This is the ordinary arrangement in city dwellings, and will serve to illustrate the application of my invention.

My heating apparatus is preferably constructed of plate or sheet iron, and is built or set in the chimney-breast or brick-work over the range, and between it and the floor above.

E is the inclosing-casing or air-chamber of the heater, usually made of rectangular form for convenience, and open only for the induction and eduction of air.

F is the induction-pipe, which may lead down through the kitchen-floor, and thence under said floor to the outer air; or it may be arranged to take air from any point. It is best, however, to take pure air from outside the house for obvious reasons.

G is the eduction-pipe, which is shown as provided with an ordinary register-aperture, G', to admit the heated air to the parlor.

It is obvious that the usual ducts for hot air may be led from G up to the room or rooms above the parlor, so as to warm them also; but I have not deemed it necessary to show these, as they may be supplied by any one accustomed to putting up heating apparatus.

Ranges almost universally have two pipes, H H', for the escape of smoke and heated gases, and these are here arranged to enter a horizontal flue, I, inside the casing E. This flue is not of course open to the interior of E.

Mounted on flue I are two zigzag or reflexed flues, J and J', one of which taps the roof of flue I at $a$, preferably directly over the point where pipe H enters, and the other of which taps flue I at $a'$, over the point where pipe H' enters. These flues J J' eventually come together above, and are connected at their upper ends by a collar, $b$, on which is mounted the pipe K, which conveys the smoke and gases into the chimney-flue. This pipe K, I usually arrange to pass up through the hot-air flue, in order that the heat it radiates may be utilized as fully as possible.

It will be understood that the air entering the casing or chamber E, and passing up through the same to the register or registers above, will absorb the heat radiated from the extended heating-surface afforded by the flues J J', and be thus heated. The temperature of the air may thus be raised from 32° Fahrenheit to 90° Fahrenheit without difficulty.

In order to send all of the products of combustion through either of the pipes H H' of the range, or to regulate the draft, these pipes are provided with dampers c c', as seen in Fig. 1; but in addition to these I arrange dampers d d' in the flues J and J', respectively, at a and a'. These are placed above and beyond the flue I for special reasons, which I will now state.

When for any reason it is not desired to send the products of combustion through the flues J J', the dampers d d' are closed and a damper, e, in a flue, L, opened. This flue leads from the flue I directly to a flue in the chimney at any convenient point. This arrangement, by which the products may be passed through the heater-flues or directly to the chimney at will by merely closing one set of dampers and opening another, is very important. When a fire is to be built in the range, and a strong draft is desired temporarily, or when the fire is low and requires to be revived, then the dampers may be so set as to pass the products directly to the chimney, and during warm weather, when no heat is required, the flues J J' may be cut off normally by means of said dampers. In this case, however, should a cold day or two intervene, the products may be sent through the heater in a moment by simply shifting the dampers, as described.

M is a door in the lower or under face of the flue I, which controls an aperture to lead the gases and vapors generated in cooking into flue I. This provision is similar to that usually found on ranges.

As my apparatus is designed to form a fixture or part of the house, as distinguished from movable furniture, I have shown it adapted to be used in conjunction with a range; but it is obvious that it may as well be employed in conjunction with any ordinary cooking-stove, which differs from an ordinary range mainly in having but one oven and one pipe for the escape of the products of combustion.

The construction of the reflexed or tortuous flues J J' shown in the drawings is that preferred; but it is obvious that this may be varied to some extent without departing materially from the spirit of my invention. The object is to get an extended heating-surface without impeding the draft to too great an extent, and any arrangement of a similar character to that shown will serve.

In Fig. 4 I have shown a slightly-modified construction in which the flue I is arranged below and without the hot-air chamber E, and the air-induction pipe or flue F is arranged to enter at the back of the casing or chamber E, instead of at the bottom.

Figure 5:
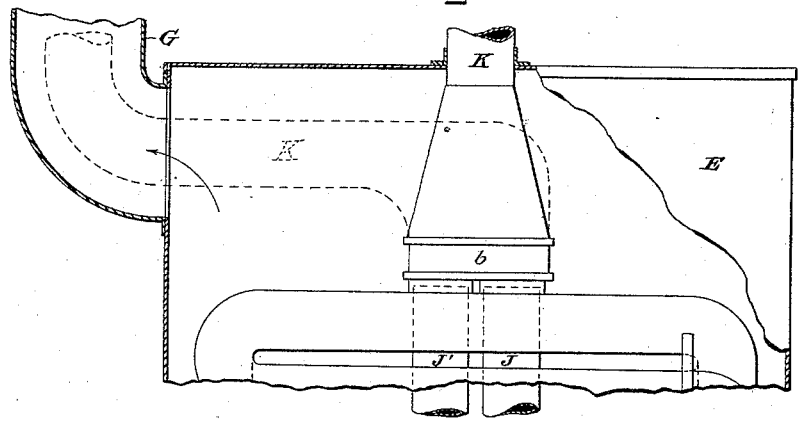

I wish it understood that I do not limit myself to any particular arrangement of the air induction and eduction apertures in the casing or chamber E. The eduction-aperture might be, for example, in the end or back or front of E, and the induction-aperture might be near the top, instead of near the bottom. In Fig. 5, for example, the eduction-aperture is arranged in the end of casing E. In this construction the smoke-flue K may be arranged, if desired, as indicated by the dotted lines, to pass out through the aperture G.

Figure 6:
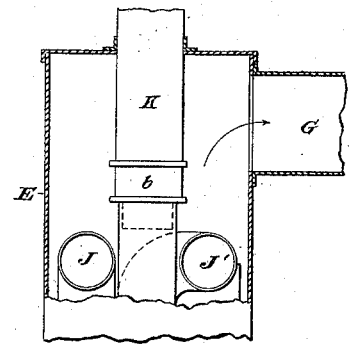

In Fig. 6 the eduction-aperture is shown in the back of the casing E. This view will also serve to illustrate the arrangement of said aperture in the front of the casing.

Figure 7:
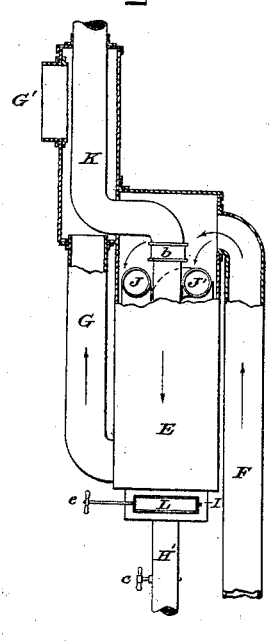

Fig. 7 illustrates the induction-pipe F as entering at the upper part of the casing, and the eduction-pipe G as entering at the lower part. In this case the air flows downward in the casing.

In all of these modifications the construction in other respects is substantially the same as that shown in Figs. 1 and 2.

My apparatus might also be applied to a heating-stove as well as a cooking-stove, but it would rarely be of advantage so applied.

Figure 8:
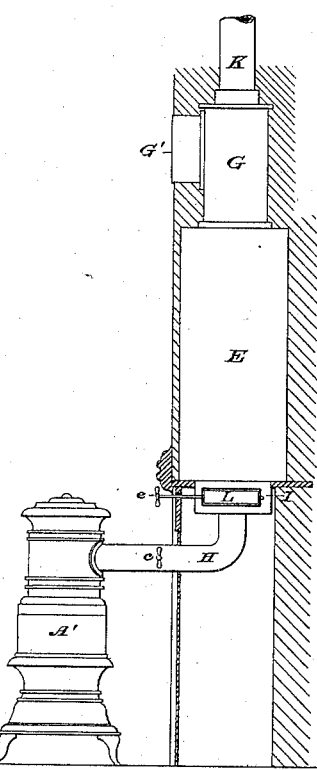

In Fig. 8 I have shown this application of my device, A' in this view representing any form of heating-stove set up in the room in the usual way. The pipe H of the stove leads the products of combustion to the flue I of the apparatus in the same way as the pipes H H' in Figs. 1 and 2 lead the products to the said flue I.

I do not broadly claim the employment of contorted flues for the products of combustion arranged within an air-heating chamber, as this has been proposed before; nor do I broadly claim providing a range with two flues for the products of combustion, one for direct draft and one for heating the air in an air-conduit, for this also has been before proposed.

What I do claim will be specifically defined in the claims forming a part of this specification.

I reserve to myself the right to employ all known mechanical equivalents of the invention herein described.

Having thus described my invention, I claim—

1. An apparatus for utilizing the waste heat of ranges and stoves, comprising an exterior casing or air-chamber provided with air induction and eduction openings, a flue, I, arranged at the bottom of said chamber and provided with an aperture or apertures to receive the pipe or pipes of the range or stove, the contorted heater-flues J J', connected with flue I, the pipe K, for carrying the products of combustion to the chimney-flue, the branch flue L, and the dampers, d d', and e, all arranged substantially as set forth.

2. The combination, to form a heating apparatus for the purposes specified, of the chamber E, its air-induction pipe F, its air-eduction pipe G, the flues J J', arranged within chamber E and connected at the bottom with a flue, I, the said flue connected with the smoke-pipes of a range or stove, substantially as described, and the pipe K, arranged within the air-eduction pipe G and constructed to receive the products of combustion from the flues J J', substantially as set forth.

In witness whereof I have hereunto signed my name in the presence of two subscribing witnesses.

WILLIAM T. HOLLAND.

Witnesses:
HENRY CONNETT,
ARTHUR C. FRASER.